(12) United States Patent
Winston

(10) Patent No.: US 7,487,935 B2
(45) Date of Patent: Feb. 10, 2009

(54) AIRCRAFT HAVING VARIABLE INCIDENCE WING AND AIR CUSHION LANDING SYSTEM

(76) Inventor: Robert Allen Winston, 660 Santa Fe Trail, Lusby, MD (US) 20657

( * ) Notice: Subject to any disclaimer, the term of this patent is extended or adjusted under 35 U.S.C. 154(b) by 344 days.

(21) Appl. No.: 11/478,165

(22) Filed: Jun. 29, 2006

(65) Prior Publication Data
US 2007/0131819 A1 Jun. 14, 2007

Related U.S. Application Data

(60) Provisional application No. 60/697,175, filed on Jul. 7, 2005.

(51) Int. Cl.
*B64C 3/42* (2006.01)
*B64C 15/02* (2006.01)
*B60V 1/04* (2006.01)
*B60V 1/11* (2006.01)

(52) U.S. Cl. .................. 244/12.3; 244/48; 180/127

(58) Field of Classification Search ............... 244/12.1, 244/12.3, 12.5, 47, 48, 100 A, 105; 180/127
See application file for complete search history.

(56) References Cited

U.S. PATENT DOCUMENTS

| | | | |
|---|---|---|---|
| 1,865,744 A | 7/1932 | Cornelius | |
| 2,406,588 A | 8/1946 | Cornelius | |
| 2,483,663 A | 10/1949 | Nowak | |
| 2,989,269 A | 6/1961 | Le Bel | |
| 3,070,327 A | 12/1962 | Dornier et al. | |
| 3,082,976 A | 3/1963 | Dornier | |
| 3,117,747 A | 1/1964 | Creasey et al. | |
| 3,124,322 A | 3/1964 | Cockerell | |
| 3,275,270 A | 9/1966 | Earl et al. | |
| 3,297,280 A | 1/1967 | Lee | |
| 3,458,007 A | 7/1969 | Todd | |
| 3,561,558 A | 2/1971 | Parkhouse | |
| 3,627,235 A | 12/1971 | Lippisch | |
| 3,870,253 A | 3/1975 | Leidy et al. | |
| 3,887,146 A * | 6/1975 | Bright | 244/12.1 |
| 3,964,698 A * | 6/1976 | Earl | 244/100 A |
| 3,981,462 A | 9/1976 | Berezhnoi et al. | |
| 4,187,999 A * | 2/1980 | Black | 244/12.5 |
| 4,298,175 A | 11/1981 | Earl | |
| 4,415,132 A | 11/1983 | Shirk | |
| 5,560,568 A * | 10/1996 | Schmittle | 244/48 |
| 6,547,181 B1 * | 4/2003 | Hoisington et al. | 244/46 |
| 2006/0009093 A1 | 1/2006 | Murphy | |

* cited by examiner

*Primary Examiner*—Rob Swiatek
(74) *Attorney, Agent, or Firm*—Robert Platt Bell

(57) ABSTRACT

An aircraft including a fuselage and at least one wing which may vary incidence with respect to the fuselage for the purpose of extremely short take off and landing and an air cushion system mounted beneath the fuselage for the purpose of surface independent taxi, take off, and landing. The wings may be straight, forward swept, swept, or have the ability to change shape and sweep based on the conditions of flight. The air cushion system may use engine thrust for lift or may use a separate lift system, which is specifically used for the air cushion. The air cushion skirt may also be rigid, non-rigid, or semi-rigid, but shall incorporate a flotation and support system, to allow flotation on water and parking of the aircraft on solid surfaces.

26 Claims, 7 Drawing Sheets ated July 1969; and Parkhouse, U.S. Pat. No. 3,561,
AIRCRAFT HAVING VARIABLE INCIDENCE WING AND AIR CUSHION LANDING SYSTEM

CROSS-REFERENCE TO RELATED APPLICATIONS

The present application claims priority from Provisional U.S. Patent Application No. 60/697,175 filed Jul. 7, 2005, and incorporated herein by reference.

FIELD OF THE INVENTION

The present invention relates to aircraft, in particular, the present invention is directed toward an aircraft having a fuselage and at least one wing which vary incidence with respect to the fuselage for the purpose of extremely short take off and landing and an air cushion system mounted beneath the fuselage for the purpose of surface independent taxi, take off, and landing.

BACKGROUND OF THE INVENTION

An aircraft having an air cushion system is desirable for all-surface traversing. Also, an aircraft that can traverse all-surface types is desirable to have short takeoff and landing capability. Aircraft utilizing the ground effect or air cushion effect for lift are known in the art. For example, U.S. Pat. No. 4,298,175 discloses an airplane having an inflatable type air cushion confining undercarriage thereunder wherein the airplane wing structure comprise three-dimensionally enlarged inner wing components merging aerodynamically with the airplane fuselage. However, the transition from the aircraft being supported aerodynamically by the air cushion to being supported aerodynamically by the wing is the most critical segment of flight. The aforementioned patent and does not address this problem.

During the start of the takeoff roll the vehicle is totally supported by the air cushion. Once takeoff speed is reached and the aircraft is rotated to a takeoff Angle of Attack (AOA) the back of the cushion may be pressed down and contact the ground or the front of the cushion may rise up causing it to leak and loose effectiveness. This causes the vehicle to sink back to the ground and the AOA to decrease and at worst may develop into dangerous pitching oscillations. At best, the take off ground roll will be increased compared to a conventional geared aircraft, because additional airflow, and thus additional groundspeed and ground roll will be required to allow the wing sufficient lift to transition from air cushion lift to wing lift.

The following Patents relating to wing designs are also considered relevant background to the present invention, and are expressly incorporated herein by reference: Shirk, U.S. Pat. No. 4,415,132, issued November, 1983; Cornelius, U.S. Pat. No. 1,865,744, issued July, 1932; Leidy et al. U.S. Pat. No. 3,870,253, issued March 1975; Cornelius, U.S. Pat. No. 2,406,588, issued May 1944; and Lippisch, U.S. Pat. No. 3,627,235, issued December 1971.

The following Patents relating to ground effect designs are also considered relevant background to the present invention, and are expressly incorporated herein by reference: Berezhnoi, et al., U.S. Pat. No. 3,981,462, issued September 1976; Earl et al., U.S. Pat. No. 3,275,270, issued September 1966; Dornier, U.S. Pat. No. 3,082,976, issued March 1963; Creasey et al., U.S. Pat. No. 3,117,747, issued January 1964; Cockerell, U.S. Pat. No. 3,124,322, issued March 1964; Nowak; U.S. Pat. No. 2,483,663, issued October, 1949; Le Bel, U.S. Pat. No. 2,989,269, issued June 1961; Dornier, U.S. Pat. No. 3,070,327, issued December 1962; Lee, U.S. Pat. No. 3,297,280, issued January 1967; Todd, U.S. Pat. No. 3,458,007, issued July 1969; and Parkhouse, U.S. Pat. No. 3,561,558, issued February, 1971.

Murphy, published U.S. Patent Application, Publication No. 2006/0009093, published Jan. 12, 2006 and incorporated herein by reference, discloses a boat using a wing to vary lift between the hull and trims with an elevator. As the Murphy application was published after Applicant's effective Provisional filing date, it is unclear whether Murphy qualifies as "Prior Art" to applicant's invention, but is included here for completeness.

SUMMARY OF THE INVENTION

The present invention provides a solution to the aforesaid problems in that it combines an air cushion system with a variable wing allowing a smooth transition from aircushion lift wing lift. The present invention combines two highly desirable capabilities in an aircraft. These capabilities are that of surface independent ground operation and short takeoffs and landings.

The present invention combines a variable incidence wing with an air cushion system and allows for a practical system which enables an air cushion aircraft to have stability and control during takeoff and landing and allows for extremely shirt take off and landings regardless of the surface.

The present invention comprises an aircraft having a fuselage and at least one wing which may vary incidence with respect to the fuselage for the purpose of extremely short take off and landing and an air cushion system mounted beneath the fuselage for the purpose of surface independent taxi, take off, and landing. The wings may be straight, forward swept, rearward swept, or have the ability to change shape and sweep based on the conditions of flight. The air cushion system may use engine thrust for lift or may use a separate lift system, which is specifically used for the air cushion. The air cushion skirt may also be rigid, non-rigid, or semi-rigid, but may incorporate a flotation and support system, to allow flotation on water and parking of the aircraft on solid surfaces. The air cushion system allows the aircraft to transverse water, soil, vegetation, snow, ice and other ground surfaces.

In the present invention, the angle of incidence of a wing may be reduced during takeoff roll to minimize drag and quickly moved to near maximum coefficient of lift (Clmax) for takeoff. Also, the wing may be increased beyond the maximum attainable AOA for a fixed wing aircraft during takeoff and landing. Being able to vary the incidence and allowing the wing to operate near Clmax allows the aircraft to fly at very low airspeeds for takeoff and landing. The wing may also allow the hull to remain parallel to the surface and allow proper operation of the air cushion system during all phases of takeoff and landing. A variable incidence wing may also allow the aircraft to fly slowly at a constant altitude without an extreme nose high condition, as would be required with a fixed wing.

In one alternative embodiment, a variable incidence Forward-Swept Wing (FSW) configuration provides good flying and control characteristics at low speeds and thus is desirable for short takeoff and landing use. On a FSW air flows from the wing tip towards the wing root aiding in stall prevention at high AOA. A FSW may be less sensitive to AOA changes during transition from an air cushion ground run to winged flight when the angle of incidence is varied. However, it should be noted that the FSW is not required to be used in combination with the other features of the present invention, but may be provided as a separate, alternative embodiment when used with one or more features of the present invention.

DETAILED DESCRIPTION OF THE INVENTION

Figure 1:
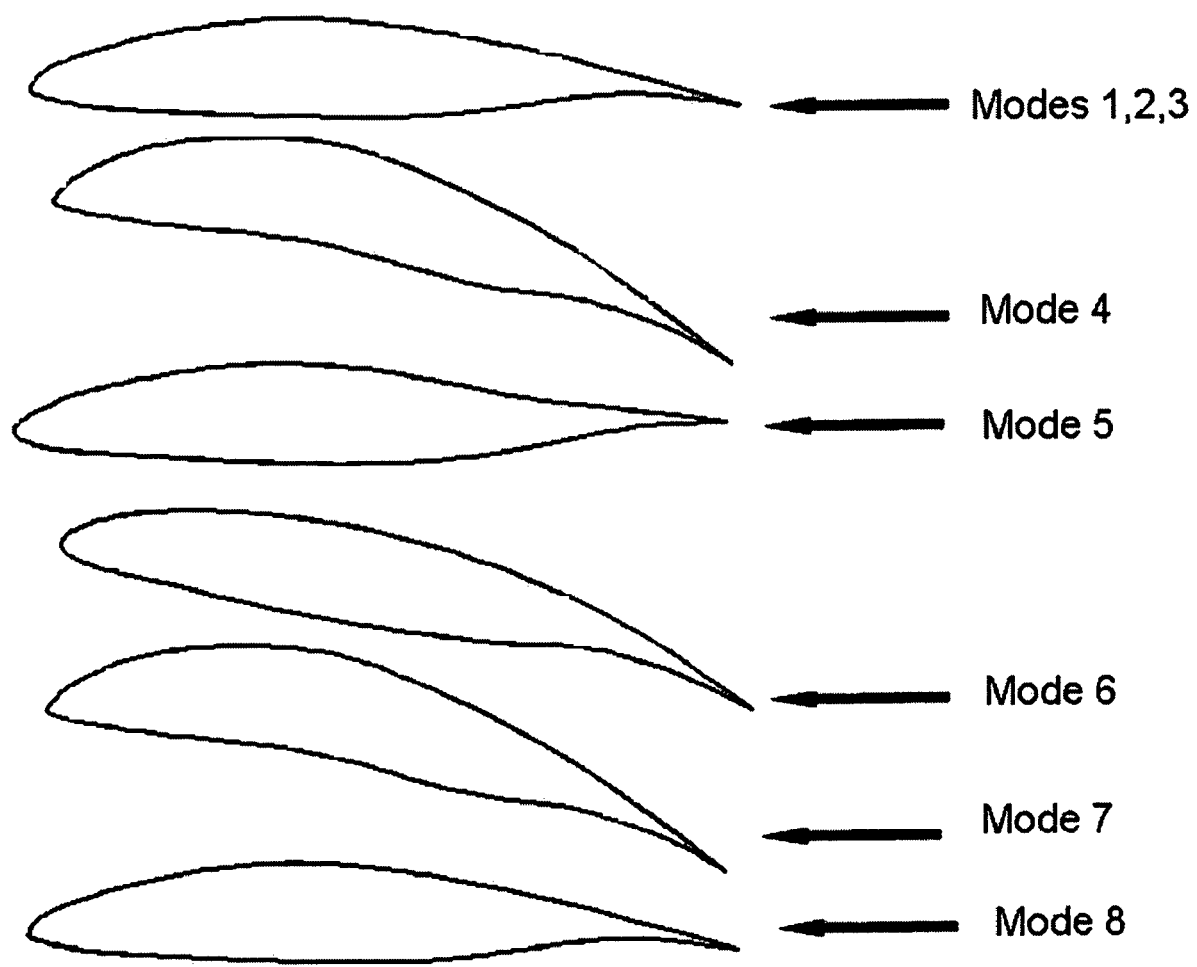
FIG. 1 is a diagram illustrating the eight modes of operation for the variable incidence and shape changing wing of the aircraft in one embodiment of the present invention.
Figure 2A:
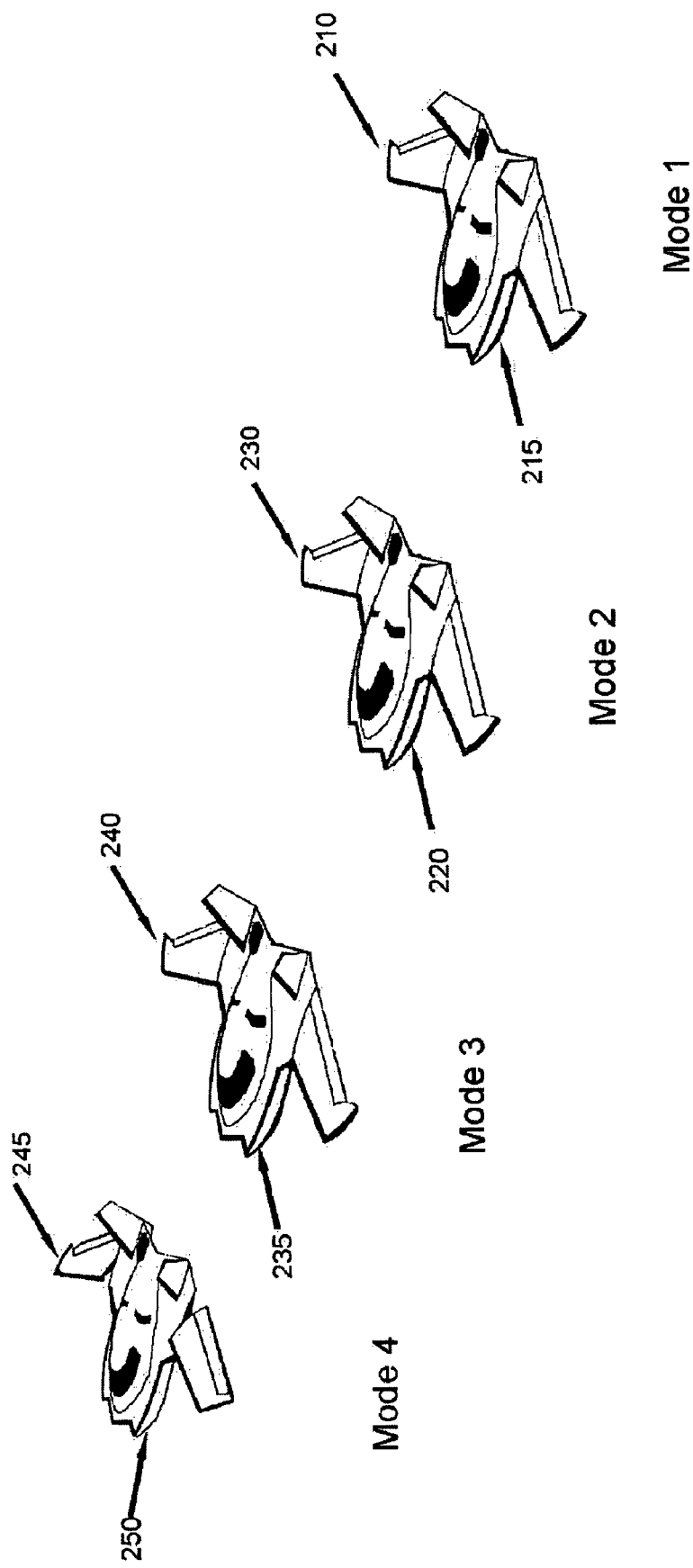
FIG. 2A is a pictorial view of the first four of the eight modes of operation for the aircraft in one embodiment of the present invention.
Figure 2B:
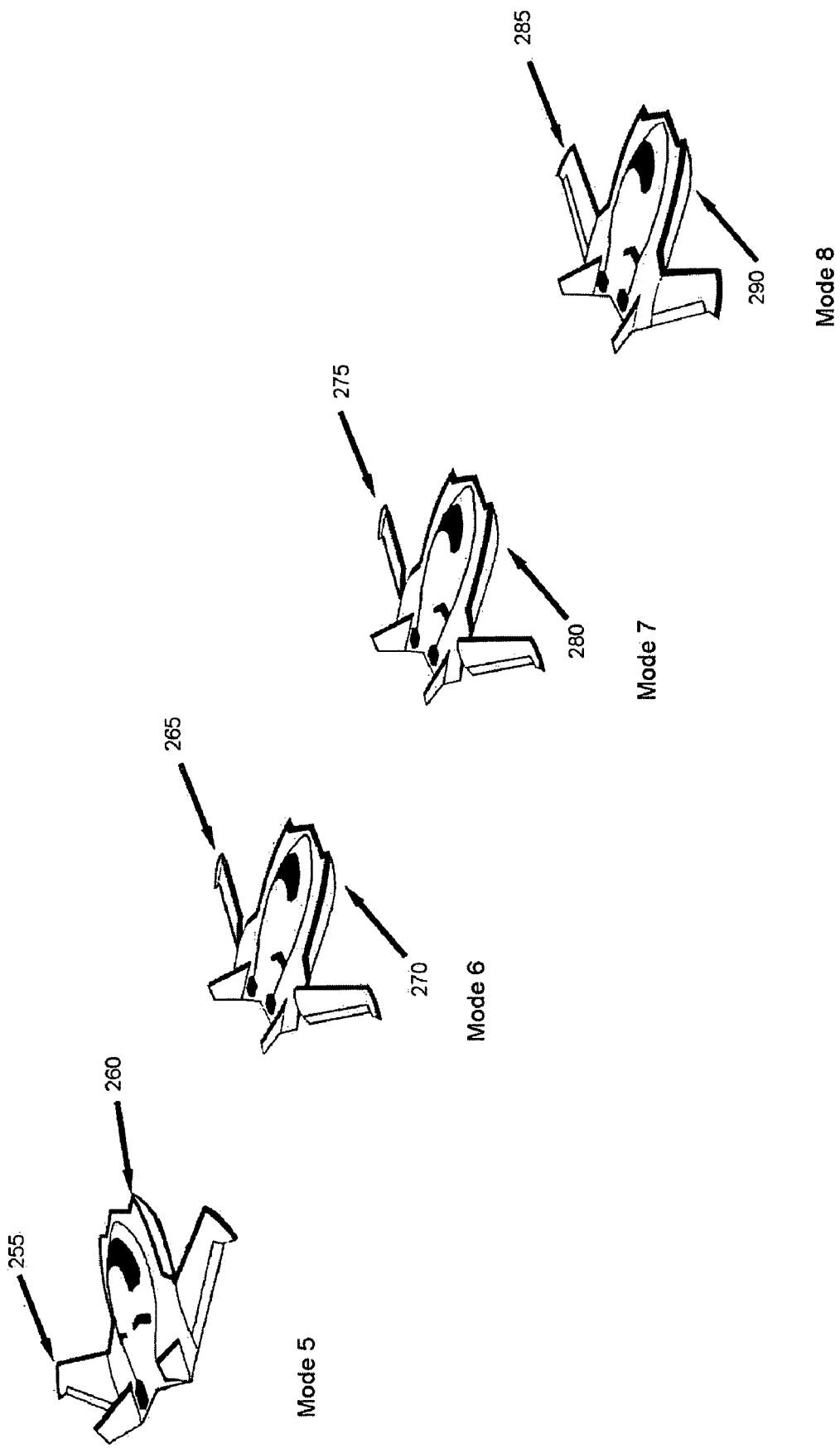
FIG. 2B is a pictorial view of the second four of the eight modes of operation for the aircraft in one embodiment of the present invention.

FIG. 1 is a diagram illustrating the eight modes of operation for the wing of the aircraft in one embodiment of the present invention. The aircraft of the present invention may be able to continuously vary the wing angle of incidence as well as high lift devices and shape as required for flight. Within the variation there are eight distinct modes of operation. FIGS. 2A and 2B present pictorial views of the eight modes of operation for the aircraft of the present invention.

Referring to FIGS. 1, 2A, and 2B, the eight modes of operation are as follows. Mode 1 is the Rest mode. In this mode the engines are shut off and the aircraft may float on its pontoons 215 in water or rest on its pontoon on the ground. The wing 210 is at the lowest drag AOA.

Mode 2 is the Hover mode. In this mode the wing 230 is set at the lowest drag AOA and engine thrust or a separate lift system is used primarily for air cushion lift 220 and secondarily for stability and orientation. Mode 3 is the Taxi and Take Off Ground Roll. In this mode the wing 240 is still set at zero AOA for the lowest drag condition and engine thrust is divided between air cushion lift 235 and forward thrust.

Mode 4 is the Climb Out mode. In this mode the wing 245 transitions quickly towards Clmax by increasing the angle of incidence, and thus AOA, while the water line of the fuselage 250 remains parallel with takeoff surface. As the wing transitions to Clmax, high lift devices may simultaneously deploy to achieve a short take off at a very low airspeed. The tail may balance the aircraft to keep the hull level. Once complete lift is achieved through its wings, the air cushion lift system is shut off and all power is available for thrust.

Mode 5 is the Cruise mode. After the climb-out, high lift devices on the wing are retracted and the wing 255 is lowered to a cruise AOA. The flaps are retracted to a low drag condition. The aircraft and fuselage 260 are fixed in relation to each other, and may then be flown conventionally.

Mode 6 is the Approach Mode. As the aircraft is slowed to approach speeds the AOA of the wing 265 is increased towards Clmax and the high lift devices are deployed. The water line of the aircraft may move towards zero to align the fuselage 270 with the landing surface. The air cushioned landing system may be turned on during short final.

Mode 7 is the Landing Flare. During landing, the wing 275 may be flared by increasing its AOA towards stall while keeping the hull 280 level, allowing the aircraft to land at a very low speed. Then the air cushion system may then take over lifting the weight of the aircraft. Initially during the first few seconds after touchdown the high lift devices may remain extended and the wing left at high AOA for maximum drag to help slow the aircraft.

Mode 8 is the Landing Ground Roll. In this mode power may divided between the air cushion system, reverse thrust and pillow braking. Pillow brakes are air inflated semi-rigid cushions inflated by engine bleed air or other pneumatic source on the bottom of the pontoons 290 for braking. Reverse thrust may be applied, and the high lift devices may be retracted and the wing 285 AOA may be decreased to zero. The air cushion pressure may be decreased to place the semi-rigid hull the proper distance from the landing surface to allow the pillow brakes to be effective. Braking may be applied and the aircraft may come to rest in a short distance.

Figure 3:
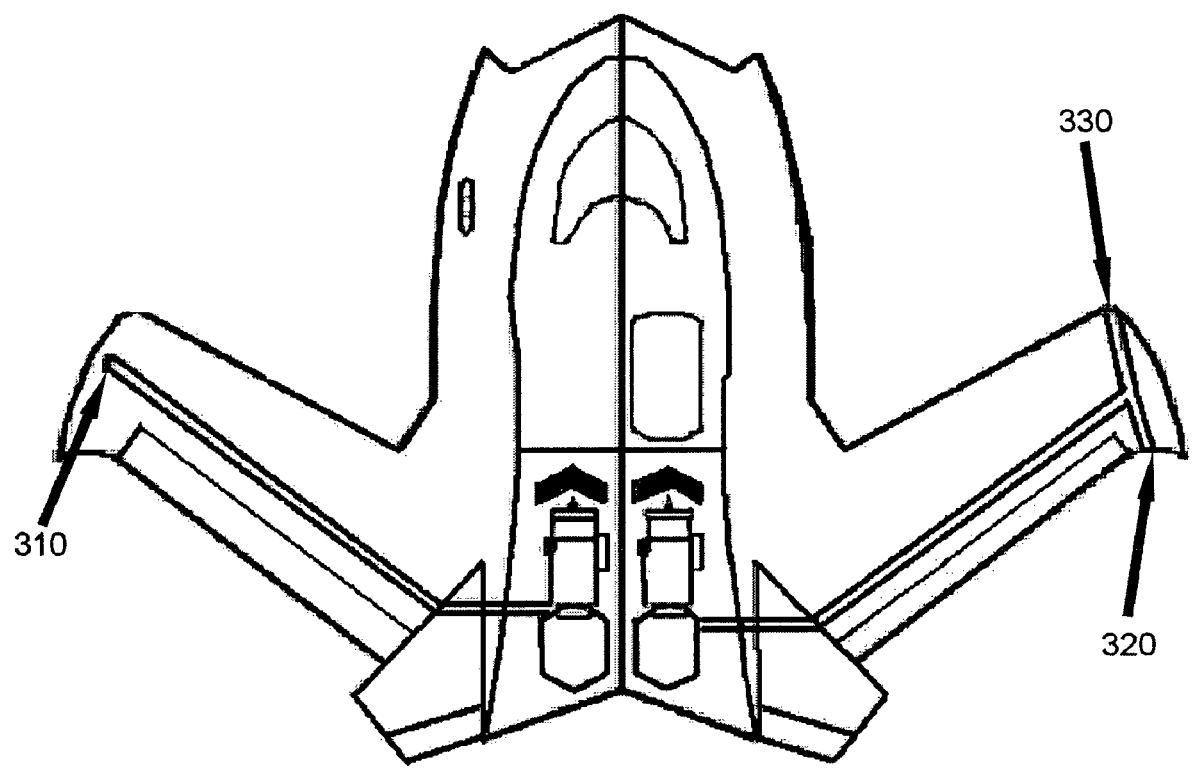
FIG. 3 is a top view of the aircraft in one embodiment of the present invention illustrating the stability augmentation system, which may use engine bleed air or thrust, or a separate pneumatic system.

FIG. 3 is a top view of the aircraft of the present invention illustrating the stability augmentation system. Note that in this Figure and other Figures of the present application, the Forward Swept Wing (FSW) configuration is shown. However, other wing configurations, including rearward swept wings, straight wings, and the like may also be used without departing from the spirit and scope of the present invention. In the alternative embodiment, a wing having a rearward sweep may be used. In a preferred embodiment, a forward swept wing such as illustrated in FIG. 3 may be used.

Referring to FIG. 3, stability and control at low speeds, in high winds, or over slopes may be achieved by a stability augmentation system, which may use engine bleed air as illustrated in FIG. 3. The ground control system uses puffer ports 310, 320 and 330 at the extremities of the aircraft and is directly connected to the flight control system to provide a natural interface for the pilot. A modulating hover control valve and port 450 in FIGS. 4A and 4B, provide air for puffer ports 310, 320 and 330.

Yaw puffer ports exit at the wing tip with one port facing forward 330 and one facing rearward 320. A simple flapper valve connected to the rudder control system may control the operation of this valve, allowing for a near zero turn radius during slow ground operations. Roll puffer ports 310 are at the wing tip with ports facing up and down. For the sake of illustration in FIG. 3, only one set of ports is shown on each wing. A simple flapper valve connected to the aileron control system may control the operation of this valve.

Figure 4A:
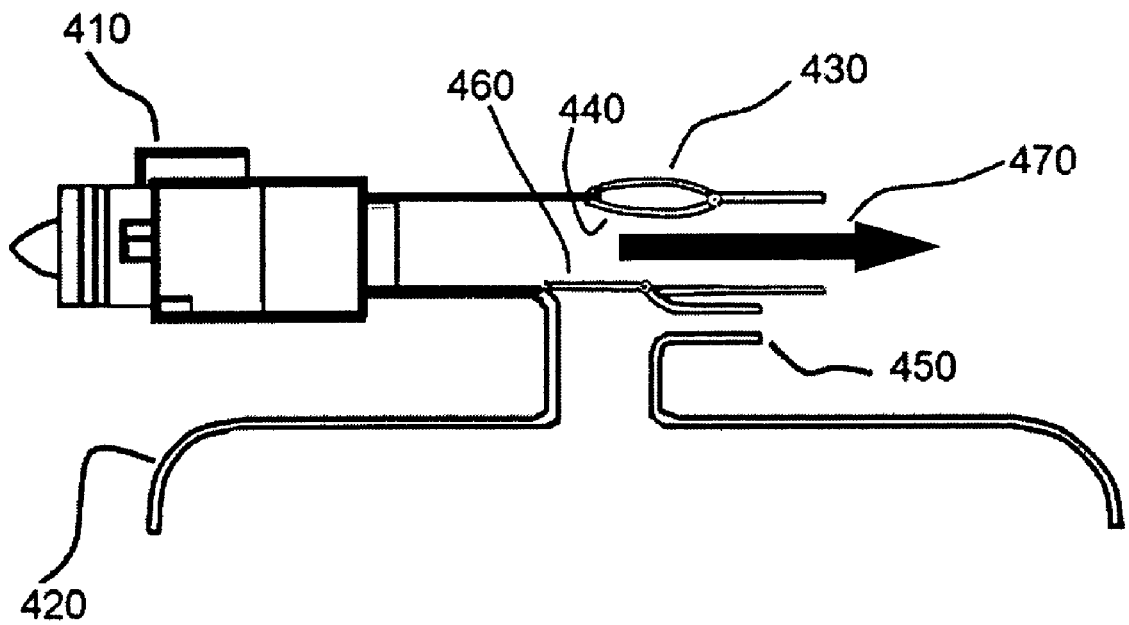
FIG. 4A is a diagram illustrating forward thrust by the engine.
Figure 4B:
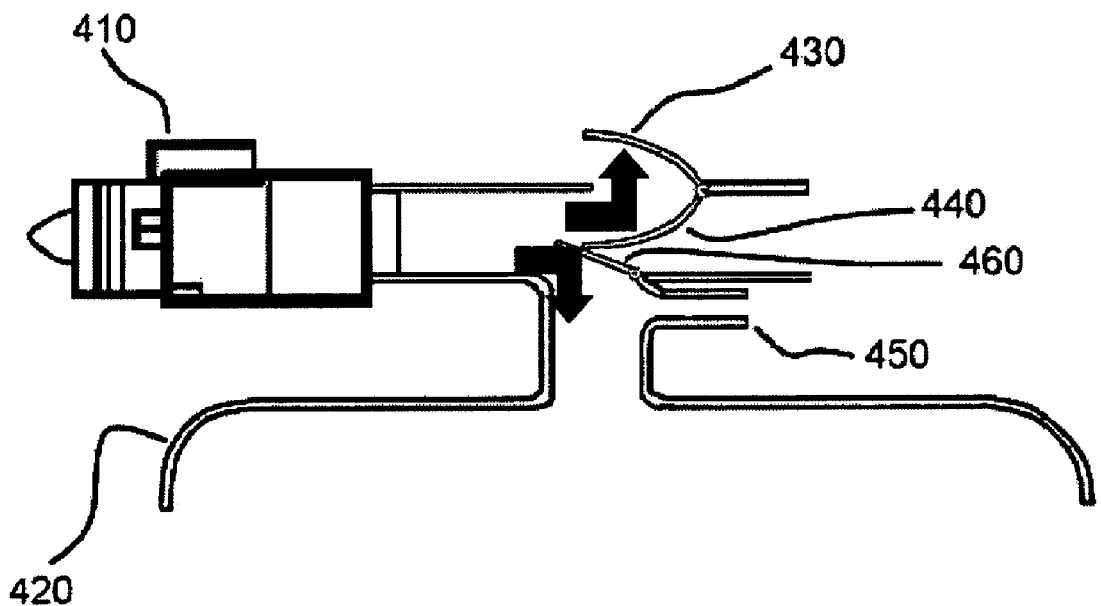
FIG. 4B illustrates how the thrust engine may also be used as a lift engine and for reverse.

FIG. 4A is a diagram illustrating how the engine 410 is used for thrust 470 and may have the exhaust directed to the air cushion area 420. Thrust reversing may be provided by a clamshell device 430 and 440 as shown in FIGS. 4A and 4B.

Figure 5A:
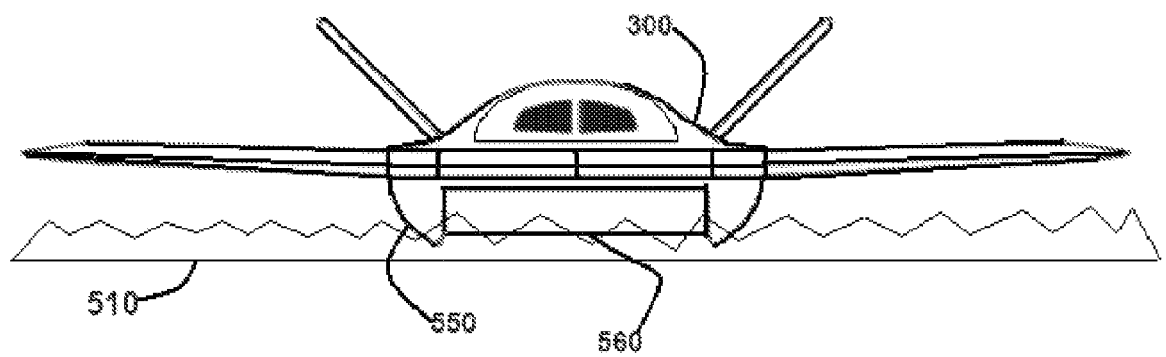
FIG. 5A is a front view of the aircraft in one embodiment of the present invention, illustrating how the two catamaran type hulls, a large flap, and a Kruger type flap may form a lift cavity to provide an air cushion.
Figure 5B:
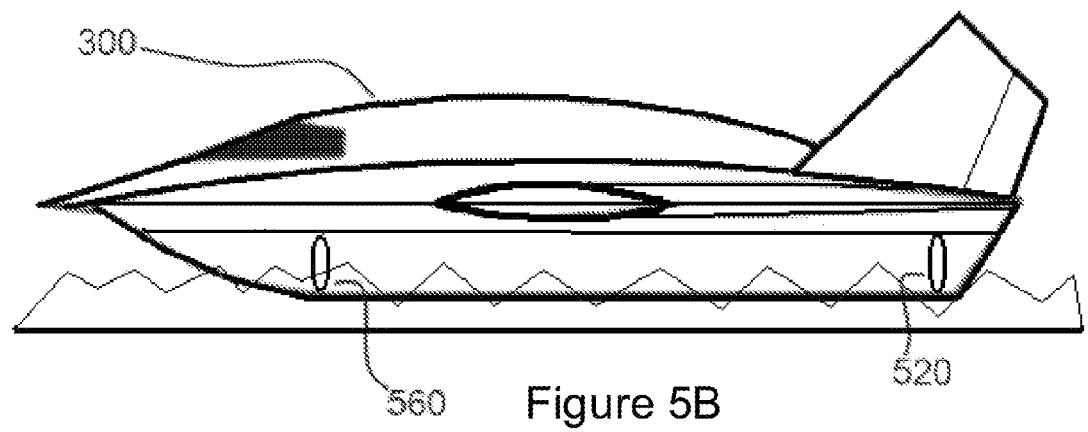
FIG. 5B is a side view of the aircraft in one embodiment of the present invention, illustrating how the two catamaran type hulls, a large flap, and a Kruger type flap may form a lift cavity to provide an air cushion.
Figure 5C:
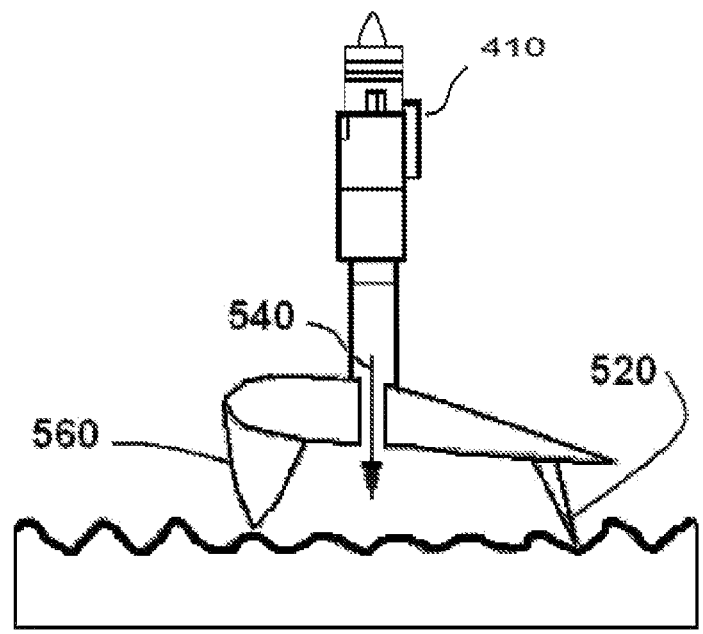
FIG. 5C is a cross-sectional view of a portion of the fuselage of the aircraft of the present invention, illustrating how the two catamaran type hulls, a large flap, and a Kruger type flap may form a lift cavity to provide an air cushion.

The lift system may comprise the area between two Catamaran type hulls 550, sealed at the rear by a large flap 520 and at the front by Kruger type flap 560, as illustrated in FIGS. 5A and 5B. FIG. 5C illustrates schematically how air may be fed through an opening 540 in the fuselage to provide a lift cushion. This arrangement of hulls and flaps may form the cavity for the air cushion, which may be powered by a lift system. Thrust from engine 410 may be diverted by flap valve 460 and ducted to the air cushion area 420, as illustrated in FIG. 4B, or an additional lift engine 410 may be used as illustrated in FIG. 5C.

The pitching moment of the wing 610 may change as the incidence is varied. Stability during the transition from air cushion ground run to winged flight may be accomplished by an interconnection 620 which varies and trims the horizontal component of the tail 630, as illustrated in FIG. 6, in order to keep the aircraft in controlled flight and the fuselage parallel to the ground.

Figure 6A:
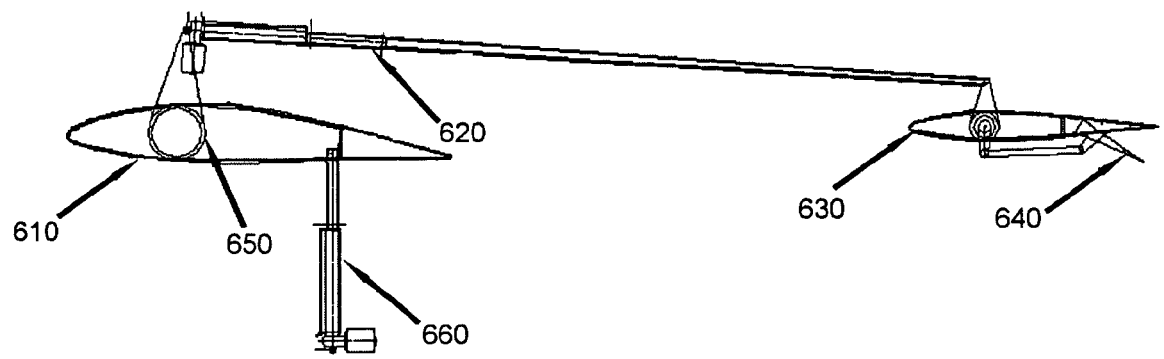
FIG. 6A is a cross-sectional view of the wing of the aircraft of the present invention, illustrating how the wing may pivot or may have a track to slide in and interconnect with the horizontal stabilizer to maintain the hull parallel with the ground during wing incidence changes.
Figure 6B:
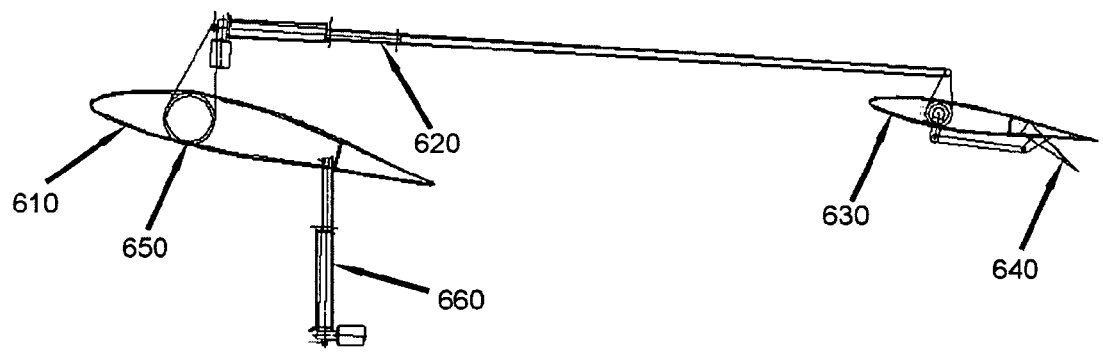
FIG. 6B is a cross-sectional view of the wing of the aircraft of the present invention, illustrating how the wing may pivot or may have a track to slide in and interconnect with the horizontal stabilizer to maintain the hull parallel with the ground during wing incidence changes.

As illustrated in FIGS. 6A and 6B, wing 610 may have a pivot point 650 or it may have a track to slide in to vary incidence. An actuator 660 may be attached to the wing and change the AOA as required. As the AOA is changed, an on-board computer or mechanical interconnect 620 may vary the incidence of the tail 630 and provide trim 640, as required.

While the preferred embodiment and various embodiments of the invention have been disclosed and described in detail herein, it may be apparent to those skilled in the art which various changes in form and detail may be made therein without departing from the spirit and scope thereof.

I claim:

1. An aircraft comprising:
   a fuselage,
   at least one controlled variable incidence wing, coupled to said fuselage, the at least one wing having a controlled variable incidence relative to said fuselage, and
   an air cushion system mounted beneath said fuselage providing a forced cushion of pressurized air ejected downwards against a surface below, for supporting the fuselage in ground effect when taxiing, take off and landing
   wherein the angle of the controlled variable incidence wing is controlled during takeoff and landing to maintain the fuselage substantially horizontal so as to maintain support of the forced air curtain.

2. The aircraft of claim 1, wherein the air cushion system includes a flotation and support system, to allow flotation on water and parking of the aircraft on solid surfaces.

3. The aircraft of claim 2, wherein the air cushion system further includes a movable portion of at least one of the leading edge and the trailing edge of the wing.

4. The aircraft of claim 1, wherein the air cushion system comprises an air curtain.

5. The aircraft of claim 1, further comprising wing mounted puffer ports for controlling the aircraft on the ground.

6. The aircraft of claim 1, further comprising a tail surface trimmed by change in incidence of the wing.

7. An aircraft comprising:
   a fuselage,
   at least one wing, coupled to said fuselage, the at least one wing having a variable incidence relative to said fuselage, and
   an air cushion system mounted beneath said fuselage for supporting the fuselage when taxiing, take off and landing,
   wherein the air cushion system includes a flotation and support system, to allow flotation on water and parking of the aircraft on solid surfaces,
   wherein the air cushion system further includes a movable portion of at least one of the leading edge and the trailing edge of the wing, and
   wherein the air cushion system further includes a portion of the wing between two catamaran type hulls, having a large rear flap to contain air in the air cushion at a rear portion of the wing portion.

8. The aircraft of claim 7, wherein the air cushion system further includes a Kruger-type front flap, for containing air in the air cushion at the front portion of the wing portion.

9. The aircraft of claim 7, wherein the at least one wing comprises at least one of straight, forward swept, and reverse swept.

10. The aircraft of claim 7, wherein the at least one wing changes shape and sweep based on conditions of flight.

11. The aircraft of claim 7, wherein the air cushion system comprises an air cushion skirt which is one of rigid, non-rigid, and semi-rigid.

12. The aircraft of claim 7, wherein the angle of incidence of the at least one wing is reduced during takeoff roll to decrease drag.

13. The aircraft of claim 7, wherein the angle of incidence of the at least one wing is increased beyond the maximum attainable angle of attack for a fixed wing aircraft during takeoff and landing.

14. The aircraft of claim 7, wherein the angle of incidence of the at least one wing is varied to allow the at least one wing to operate near maximum coefficient of lift and fly at very low airspeeds.

15. The aircraft of claim 7, wherein the angle of incidence of the at least one wing is varied to allow the fuselage to remain parallel to surface and allow proper operation of the air cushion system.

16. The aircraft of claim 7, wherein the aircushion system allows for all-surface capability for taxi, takeoff and landing by allowing aircraft to hover above obstacles.

17. The aircraft claim 7, wherein the variable incidence wing allows for a smooth transition from takeoff roll to winged flight by allowing the aircraft to quickly transfer from aircushion lift to wing lift.

18. The aircraft of claim 17 wherein the variable incidence wing allows for efficient and effective short takeoffs and landings by allowing the aircraft to fly near its maximum lift.

19. The aircraft of claim 7, wherein the variable incidence wing allows for a smooth transition from winged flight to landing roll by allowing the aircraft to quickly transfer from wing lift to aircushion lift.

20. The aircraft of claim 19 wherein the variable incidence wing allows for efficient and effective short takeoffs and landings by allowing the aircraft to fly near its maximum lift.

21. An aircraft comprising:
   a fuselage,
   at least one wing, coupled to said fuselage, the at least one wing having a variable incidence relative to said fuselage, and
   an air cushion system mounted beneath said fuselage for supporting the fuselage when taxiing, take off and landing, wherein the aircraft further includes an engine for generating thrust, and the air cushion system uses engine thrust for lift.

22. The aircraft of claim 21, wherein the air cushion system includes a flotation and support system, to allow flotation on water and parking of the aircraft on solid surfaces.

23. The aircraft of claim 22, wherein the air cushion system further includes a movable portion of at least one of the leading edge and the trailing edge of the fuselage.

24. An aircraft comprising:
   a fuselage,
   at least one wing, coupled to said fuselage, the at least one wing having a variable incidence relative to said fuselage, and
   an air cushion system mounted beneath said fuselage for supporting the fuselage when taxiing, take off and landing,
   wherein the aircraft further includes an engine for generating thrust, and the air cushion system comprises a lift system independent of the engine.

25. The aircraft of claim 24, wherein the air cushion system includes a flotation and support system, to allow flotation on water and parking of the aircraft on solid surfaces.

26. The aircraft of claim 25, wherein the air cushion system further includes a movable portion of at least one of the leading edge and the trailing edge of the fuselage.

* * * * *